United States Patent
Spitsberg et al.

(10) Patent No.: US 6,391,475 B1
(45) Date of Patent: May 21, 2002

(54) MODIFIED ALUMINUM-CONTAINING PROTECTIVE COATING AND ITS PREPARATION

(75) Inventors: Irene T. Spitsberg, Loveland, OH (US); David J. Wortman, Niskayuna, NY (US); Jon C. Schaeffer, Greenville, SC (US); Joseph D. Rigney, Milford, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/522,875

(22) Filed: Mar. 10, 2000

(51) Int. Cl.[7] ............................................. B32B 15/04
(52) U.S. Cl. .................. 428/652; 428/632; 428/680; 416/241 B
(58) Field of Search ................. 428/632, 633, 428/650, 652, 678, 680, 610; 416/241 B

(56) References Cited

U.S. PATENT DOCUMENTS

| 5,788,823 A | 8/1998 | Warnes et al. ............... 205/185 |
| 6,153,313 A | * 11/2000 | Rigney et al. ............... 428/632 |

* cited by examiner

Primary Examiner—Deborah Jones
Assistant Examiner—Jennifer McNeil
(74) Attorney, Agent, or Firm—Andrew C. Hess; David L. Narciso

(57) ABSTRACT

A nickel-base superalloy substrate has an overlying protective coating including a modified aluminum-containing protective layer. The modified aluminum-containing protective layer is formed of nickel, aluminum, calcium in an amount of from about 50 to about 300 parts per million by weight, and, optionally, elements interdiffused into the modified aluminum-containing protective layer from the substrate. Magnesium or barium may be used instead of or in addition to the calcium. A ceramic layer may overlie the modified aluminum-containing protective layer.

17 Claims, 2 Drawing Sheets

MODIFIED ALUMINUM-CONTAINING PROTECTIVE COATING AND ITS PREPARATION

The invention herein described was made in the course of or under a contract or subcontract thereunder (or grant) with the Department of the Navy.

BACKGROUND OF THE INVENTION

In an aircraft gas turbine (jet) engine, air is drawn into the front of the engine, compressed by a shaft-mounted compressor, and mixed with fuel. The mixture is combusted, and the resulting hot combustion gases are passed through a turbine mounted on the same shaft. The flow of gas turns the turbine by contacting an airfoil portion of the turbine blade, which turns the shaft and provides power to the compressor. The hot exhaust gases flow from the back of the engine, driving it and the aircraft forwardly.

The hotter the turbine gases, the more efficient is the operation of the jet engine. There is thus an incentive to raise the turbine operating temperature. However, the maximum temperature of the turbine gases is normally limited by the materials used to fabricate the turbine vanes and turbine blades of the turbine. In current engines, the turbine vanes and blades are made of nickel-based or cobalt-based superalloys that can operate at temperatures of up to 1900–2100°F.

Many approaches have been used to increase the operating temperature limits and operating lives of the airfoils of the turbine blades and vanes. The compositions and processing of the materials themselves have been improved. The articles may be formed as oriented single crystals to take advantage of superior properties observed in certain crystallographic directions. Physical cooling techniques are used. In one widely used approach, internal cooling channels are provided within the components, and cooler air is forced through the channels during engine operation.

In another approach, a protective coating formed of an environmental coating or a ceramic/metal thermal barrier coating (TBC) system is applied to the airfoil of the turbine blade or turbine vane component, which acts as a substrate. Such environmental coatings include, for example, simple diffusion aluminides, diffusion aluminides modified by the addition of a noble metal such as platinum, and overlay coatings. The surface of the environmental coating is oxidized to form an aluminum oxide scale that protects the substrate against damage by oxidation and hot corrosion.

This protective layer, with no overlying ceramic layer, is useful in intermediate-temperature applications. For higher temperature applications, a ceramic thermal barrier coating layer may be applied overlying the environmental coating to form a thermal barrier coating system. The ceramic thermal barrier coating layer insulates the component from the combustion gas, permitting the combustion gas to be hotter than would otherwise be possible with the particular material and fabrication process of the substrate.

In the thermal barrier coating application, the ceramic coating must adhere to the substrate during the service life of the protected article, and the individual layers must also remain adhered to each other. If there is a delamination, portions of the coating may spall away from the surface of the protected article. In that event, the article is exposed to the highly aggressive environment of the combustion gases and consequently fails prematurely. There is an ongoing need to reduce the incidence of failures of protective coatings. The present invention fulfills this need, and further provides related advantages.

BRIEF SUMMARY OF THE INVENTION

The present invention provides a modified environmental coating which is more resistant to spallation failures and has improved oxidation/corrosion resistance than comparable conventional coatings. The protective coating of the invention achieves the same protective benefits as conventional coatings, but is less prone to premature failures. The protective coating may be applied by techniques that are known for other applications.

A protected article includes a substrate having a surface, and a protective coating overlying and contacting the surface of the substrate. The protective coating comprises a modified aluminum-containing protective layer having a composition comprising nickel, aluminum, and at least one modifying element selected from the group consisting of calcium, magnesium, and barium, and mixtures thereof, in a total amount of at least about 50 parts per million by weight (ppmw). The modifying element is preferably present in a total amount of from about 50 ppmw to about 300 ppmw, and is most preferably calcium. The modified aluminum-containing protective layer may be, for example, a simple diffusion aluminide, a diffusion aluminide further containing a noble metal, or an overlay coating. Thus, in some cases the modified aluminum-containing protective layer may also comprise elements interdiffused into the modified aluminum-containing protective layer from the substrate.

In a thermal barrier coating system based upon this modified aluminum-containing protective layer, a ceramic layer may overlie and contact the modified aluminum-containing protective layer.

The protective coating is formed by depositing the modified aluminum-containing protective layer overlying the surface of the substrate. The addition of the modifying element to the aluminum-containing protective layer may be accomplished in any operable manner. The modifying element may be deposited before, simultaneously with, or after the deposition of the other elements of the aluminum-containing protective layer. An optional ceramic layer may be deposited overlying the modified aluminum-containing protective layer.

The present approach provides for the inclusion in the modified aluminum-containing protective layer of a modifying element that reacts with free sulfur, such as calcium, magnesium, or barium. Free sulfur, as distinct from reacted and combined sulfur, may diffuse to a surface and, once at the surface, accelerate the spallation of the aluminum oxide scale that is present on the surface of the aluminum-containing protective layer and, if a ceramic layer is present, accelerate its spallation. Loss of the aluminum oxide scale due to spallation results in a decrease in the oxidation resistance of the coated article. Loss of the ceramic layer, if present, results in a loss of its insulating effect. The modifying element reacts with free sulfur to form a sulfide compound, which prevents the sulfur from diffusing to the free surface and consequently inhibits, and desirably prevents, the spallation of the aluminum oxide scale and/or the ceramic layer. The modifying element must be present in an amount sufficient to combine with the free sulfur present near the surface of the substrate and in the deposited layers. It has been found that at least about 50 ppmw of the modifying element must be present to react with the sulfur content that is typically present in such situations.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
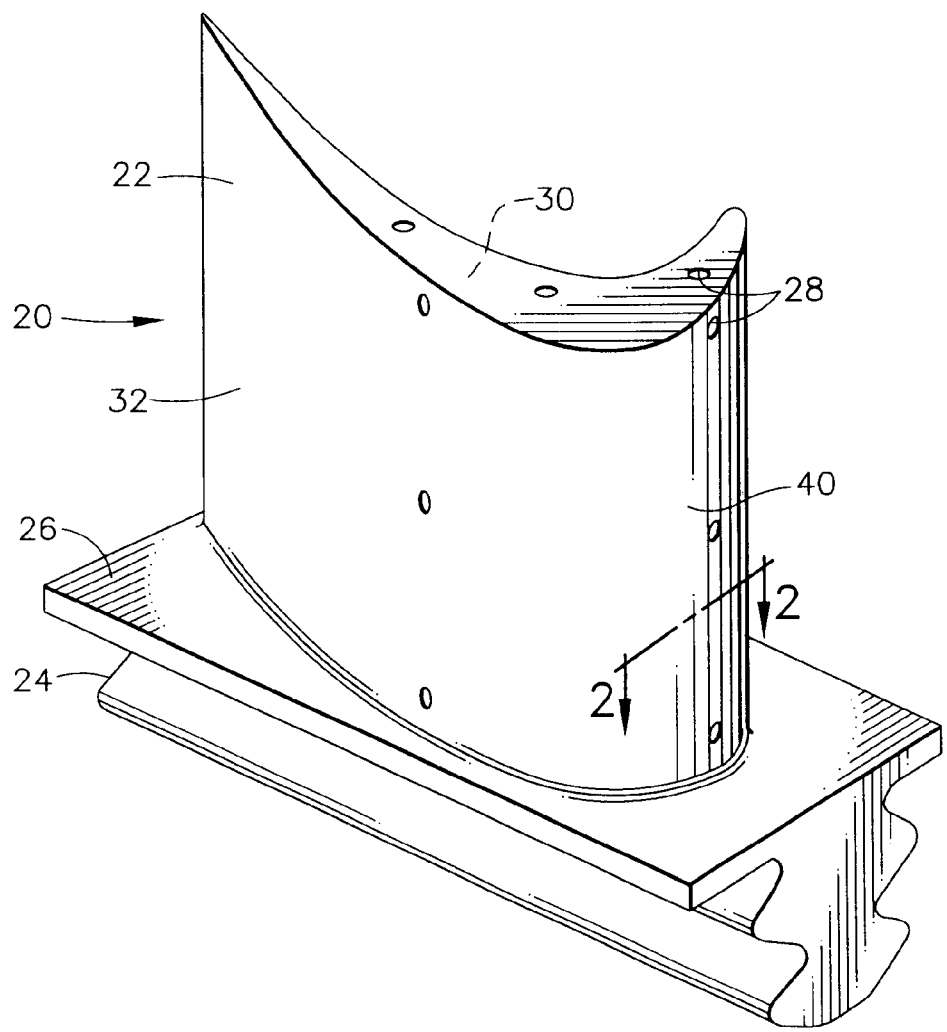
FIG. 1 is a perspective view of a turbine blade.

FIG. 1 depicts a component article of a gas turbine engine such as a turbine blade or turbine vane, and in this illustration a turbine blade 20. The turbine blade 20 includes an airfoil 22 against which the flow of hot exhaust gas is directed. (The turbine vane has a similar appearance in respect to the pertinent airfoil portion.) The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 meets the dovetail 24. In some articles, a number of cooling channels extend through the interior of the airfoil 22, ending in openings 28 in the surface of the airfoil 22. A flow of cooling air is directed through the cooling channels, to reduce the temperature of the airfoil 22. As illustrated, the airfoil 22 portion of the turbine blade 20 is curved in an airfoil shape. There is a concavely curved side, termed the concave side 30 (also sometimes known as the "pressure" side of the airfoil), and a convexly curved side, termed the convex side 32 (also sometimes known as the "suction" side of the airfoil).

Figure 2:
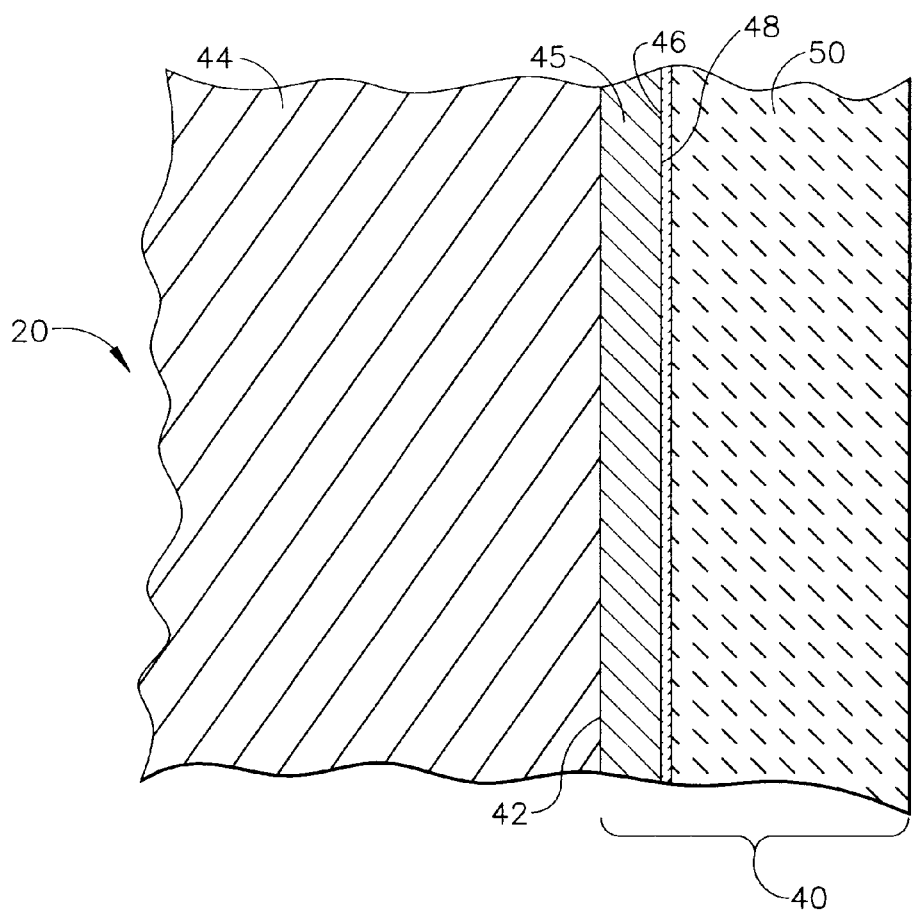
FIG. 2 is a schematic enlarged sectional view through the airfoil of the turbine blade, taken along line 2-2.

FIG. 2 schematically illustrates the turbine blade 20 in sectional view, after a protective coating 40 is applied to a surface 42 of the turbine blade 20, which serves as a substrate 44. Typically, the protective coating is applied to the airfoil 22, but it may be applied to other portions of the article as well. The base metal forming the substrate 44 is typically a nickel-base superalloy. The nickel-base superalloy has more nickel than any other single element, and is strengthened by gamma-prime precipitation in a gamma matrix.

The protective coating 40 includes a modified aluminum-containing protective layer 45 that overlies and contacts the surface 42 of the substrate 44. An outwardly facing surface 46 of the aluminum-containing protective layer 45 oxidizes during processing and/or during service to form an aluminum oxide ($Al_2O_3$) scale 48. The modified aluminum-containing protective layer 45 comprises one or more modifying elements in a total amount of at least about 50 parts per million by weight (ppmw), preferably from about 50 ppmw to about 300 ppmw, and most preferably from about 50 ppmw to about 100 ppmw. These values are actual values deposited and present within the layer 45, not values in the source of the modifying element. The modifying element is preferably calcium, but it may instead be magnesium and/or barium, or mixtures thereof. If the amount of the modifying element is too small, it will not react a sufficient amount of the sulfur at the surface of the substrate 44 and in the modified aluminum-containing protective layer 45, and there is a tendency for delamination and spalling of the aluminum oxide scale 48 and/or any overlying ceramic layer that is present. If the amount of the modifying element is too large, the excessive amount of the modifying element will be incorporated into the aluminum oxide scale 48. Since the specific volume of such a modified oxide is different from that of aluminum oxide, defects will be formed in the aluminum oxide film. This will result in the loss of the aluminum oxide protective properties, a large oxide growth rate, and premature oxide failure.

Three types of thus-modified aluminum-containing protective layers 45 are of most interest and are described next.

In one, the aluminum-containing protective layer 45 is a simple diffusion aluminide. The at least one modifying element (calcium, magnesium, and/or barium) may be deposited onto the surface 42 prior to the deposition of aluminum, as by plating or sputtering. The simple diffusion aluminide is formed by depositing a coating comprising aluminum onto the surface 42, by any operable technique. One such technique is vapor phase aluminiding, where a source of a flowable precursor coating material is provided. The source of aluminum is preferably a gaseous source. A mixture of an aluminum-containing material (preferably aluminum metal, aluminum alloy, or aluminum-containing compound) and a halide activator, preferably aluminum chloride, aluminum fluoride, or ammonium fluoride, is placed into a source chamber. The modifying element may be deposited concurrently with the aluminum. In that event, the source of the modifying element is preferably an elemental powder containing the modifying element or a decomposable compound containing the modifying element. The activators and the halide gas containing the modifying elements, if any, contact the aluminum-containing material and the source of the modifying element to form the corresponding halide gas. Argon or hydrogen gas is flowed through the source chamber, providing a carrier for the gaseous source of aluminum and the modifying element. The gas mixture is flowed over the surface 42, depositing the aluminum and the modifying element thereon. The source is typically heated to a deposition reaction temperature of from about 1800° F. to about 2100° F. so that deposited aluminum atoms and atoms of the modifying elements interdiffuse into the substrate 44. The modified aluminum-containing protective layer 45 is preferably from about 0.0005 to about 0.005 inch thick. As an example, a coating of aluminum and the modifying elements about 0.002 inch thick may be deposited in about 4–8 hours using this approach. Optionally, the heating may be continued after the flow of the source gas is discontinued, to achieve further interdiffusion. Other operable approaches may be employed for introducing the aluminum onto the surface 62. Examples include chemical vapor deposition, slurry-coating processes, foam coating, organo-metallic chemical vapor deposition, pack cementation, and above-the-pack aluminiding.

In a second approach, the modified aluminum-containing protective layer 45 is a diffusion aluminide further containing a noble metal, and containing the modifying element. Such a layer 45 initially comprises a platinum-rich layer that directly overlies and contacts the surface 42, and an aluminum-rich layer that overlies and contacts the platinum-rich layer. (The platinum-rich layer may instead be enriched in another noble metal such as palladium or rhodium, but platinum is preferred and is discussed here.) The platinum-rich layer and the aluminum-rich layer are typically deposited separately, and then interdiffused with each other and with the material of the substrate 44 by heating during and/or after processing. The platinum-rich layer and the aluminum-rich layer are initially distinct, but, with increasing interdiffusion, the layers become increasingly interdiffused, so that their demarcation becomes less distinct. This form of the modified aluminum-containing protective layer 45 typically comprises nickel, aluminum, platinum (or other noble element such as rhodium or palladium), and elements interdiffused into the layer 45 from the substrate 44. Preferably, the modified aluminum-containing protective layer 45 comprises from about 18 to about 32 weight percent aluminum for the diffusion aluminide, while lower aluminum content is possible for a thermally sprayed layer 45. Preferably, the modified aluminum-containing protective layer 45 comprises from about 18 to about 45 weight percent platinum. These compositional values are averages over the entire thickness of the modified aluminum-containing protective layer 45. However, amounts outside these ranges are operable. Prior to interdiffusion, the platinum-enriched layer is typically from about 0.0001 to about 0.0004 inches thick, and the aluminum-enriched layer is from about 0.0005 to about 0.005 inches thick. As in the case of the simple diffusion aluminide, the modifying element (calcium, magnesium, and/or barium) may be deposited on the surface 42 prior to deposition of the platinum, concurrently with the platinum, or after the platinum is deposited, by the techniques discussed earlier.

To deposit the modified aluminum-containing protective layer 45, the platinum-rich layer is deposited and the modifying element is deposited. The deposition of the modifying element may be before, simultaneously with, or after the deposition of the platinum. To deposit the modifying element before or after the deposition of the platinum, the modifying element by itself or in an alloyed or compound form is deposited as a thin layer onto the surface 42 by any operable technique. Examples of such techniques include sputtering and chemical vapor deposition.

The platinum is preferably deposited by electroplating onto the surface 42 of the substrate 44. The deposition is preferably accomplished by placing a platinum-containing solution into a deposition tank and depositing platinum from the solution onto the substrate 44. An operable platinum-containing aqueous solution is $Pt(NH_3)_4HPO_4$ having a concentration of about 4–20 grams per liter of platinum, and the voltage/current source is operated at about ½–10 amperes per square foot of facing article surface. The platinum layer about 0.0002 inches thick is deposited in 1–4 hours at a temperature of 190–200° F. If the modifying element is deposited simultaneously with the platinum, a source of the modifying element is mixed with the platinum-containing aqueous solution. For example, to deposit calcium simultaneously with the platinum, metallic calcium, calcium hydroxide, or calcium chloride is added to the platinum-containing solution in an amount sufficient to deposit the above-indicated concentration of calcium in the coating.

After the platinum-rich layer is deposited, the aluminum-rich layer is deposited overlying the platinum-rich layer by any operable technique. One such technique is vapor phase aluminiding, where a source of a flowable precursor coating material is provided. The source of aluminum is preferably a gaseous source. A mixture of an aluminum-containing material (preferably aluminum metal, aluminum alloy, or aluminum-containing compound) and a halide activator, preferably aluminum chloride, aluminum fluoride, or ammonium fluoride, is placed into a source chamber. Other elements may be doped into the aluminum-rich layer from gaseous sources that are mixed with the source of aluminum. The activators and the halide gas containing the modifying elements contact the aluminum-containing material to form the corresponding halide gas. Argon or hydrogen gas is flowed through the source chamber, providing a carrier for the gaseous source of aluminum. The gas mixture is flowed over the surface of the platinum-rich layer, depositing the aluminum thereon. The source is typically heated to a deposition reaction temperature of from about 1800° F. to about 2100°F. so that deposited aluminum atoms interdiffuse with the platinum-rich layer and the modifying elements, as well as with the atoms of the substrate 44. The aluminum-rich layer is preferably from about 0.0005 to about 0.005 inch thick. As an example, a coating of aluminum about 0.002 inch thick may be deposited in about 4–8 hours using this approach. Other operable approaches may be employed for depositing the aluminum-rich layer. Examples include chemical vapor deposition, slurry-coating processes, foam coating, organo-metallic chemical vapor deposition, pack cementation, and above-the-pack aluminiding. Optionally, the heating may be continued after the flow of the source gas is discontinued, to achieve further interdiffusion, numeral 64.

In a third approach, the surface 42 may instead be coated with an overlay coating such as the MCrAlX overlay modified aluminum-containing protective layer 45. The terminology "MCrAlX" is a shorthand term of art for a variety of families of overlay layers. In this and other forms, M refers to nickel, cobalt, iron, and combinations thereof. In some of these protective coatings, the chromium may be omitted. The X denotes elements such as hafnium, tantalum, rhenium, platinum, silicon, titanium, boron, carbon, and combinations thereof. Specific compositions are known in the art. The modified aluminum-containing protective layer 45, when in an overlay form such as MCrAlX, typically contains from about 6 to about 32 weight percent aluminum. The MCrAlX layer 45 is preferably from about 0.0005 to about 0.005 inch thick, most preferably about 0.002 inch thick. The MCrAlX overlay layer 45 is deposited by any operable physical vapor deposition technique, such as sputtering, cathodic arc, electron beam, or plasma spray. As with the diffusional modified aluminum-containing protective layer 45, the overlay modified aluminum-containing protective layer has a surface that is oxidized to produce a thin aluminum oxide scale 48. The modifying element (calcium, magnesium, and/or barium) may be deposited onto the surface 42 prior to deposition of the overlay layer 45 or concurrently therewith. Concurrent addition is accomplished by addition into a sprayed powder, addition into an electron-beam physical vapor deposition ingot or as a separate source, or addition into a cathodic arc or ion plasma process source, for example.

If no further layer is deposited overlying the modified aluminum-containing protective layer 45, the modified aluminum-containing protective layer 45 is termed an "environmental coating". The environmental coating may be satisfactory for protecting turbine blades and vanes that are not exposed to the highest temperatures, such as the convex sides 32 of high pressure turbine blades and vanes, low-pressure turbine blades and vanes, or other components that are not exposed to high temperatures such as shrouds and center bodies. For those portions of the turbine blades and vanes that are exposed to the highest temperatures, such as the concave sides 30 of the high-pressure turbine blades and vanes, the protective coating 40 further includes a ceramic layer 50 that overlies the modified aluminum-containing protective layer 45 to provide additional thermal protection. In this structure, the modified aluminum-containing protective layer 45 is termed a "bond coat". The bond coat 45 and the ceramic layer 50 are together termed a "thermal barrier coating system".

The ceramic layer 50, where present, is preferably from about 0.003 inches to about 0.030 inches thick, more preferably from about 0.003 to about 0.010 inches thick, most preferably about 0.005 inch thick. The ceramic layer 50 is operable in thicknesses outside this range, but is less desirable. Lesser thicknesses of the ceramic layer 50 tend to give insufficient insulation to the substrate. Greater thicknesses of the ceramic layer 50 tend to add unnecessary weight to the article. The ceramic layer 50 is preferably yttria-(partially) stabilized zirconia, which is a zirconium oxide-base ceramic material containing from about 2 to about 12 weight percent of yttrium oxide. Other operable stabilizing oxides and ceramic base materials may be used as well.

Figure 3:
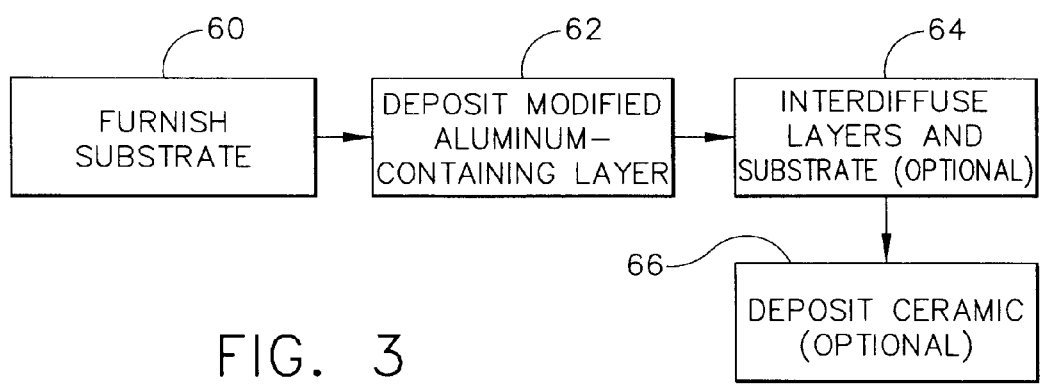
FIG. 3 is a block flow diagram of a method for practicing the invention.

FIG. 3 illustrates a process for making the article 20 having the thermal barrier protective coating 40 thereon. An article substrate is provided, numeral 60. The article substrate is preferably the airfoil 22 of FIG. 1, either as part of a turbine blade or turbine vane that serves as the substrate 44. The present approach may be used with other hot-section article substrate components as well, such as combustor center bodies, other combustor components, turbine shrouds, and the like. The airfoil (and all of the turbine blade or turbine vane) may be made of any operable base-metal alloy material, with a nickel-base superalloy being preferred. The preferred nickel-base alloy has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.015 percent boron, from 0 to about 0.1 percent yttrium, from 0 to about 1.5 percent hafnium, balance nickel and incidental impurities.

A most preferred alloy composition is Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 40 parts per million boron, about 0.15 percent hafnium, up to about 0.01 percent yttrium, balance nickel and incidental impurities. Other operable superalloys include, for example, Rene' 142, which has a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.50 percent hafnium, about 0.12 percent carbon, about 150 parts per million boron, balance nickel and incidental impurities; Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; CMSX-4, which has a nominal composition in weight percent of about 9.70 percent cobalt, about 6.6 percent chromium, about 0.60 percent molybdenum, about 6.4 percent tungsten, about 3.0 percent rhenium, about 6.5 percent tantalum, about 5.6 percent aluminum, about 1.0 percent titanium, about 0.10 percent hafnium, balance nickel and incidental impurities; CMSX-10, which has a nominal composition in weight percent of about 7.00 percent cobalt, about 2.65 percent chromium, about 0.60 percent molybdenum, about 6.40 percent tungsten, about 5.50 percent rhenium, about 7.5 percent tantalum, about 5.80 percent aluminum, about 0.80 percent titanium, about 0.06 percent hafnium, about 0.4 percent niobium, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities; PWA1484, which has a nominal composition in weight percent of about 10.0 percent cobalt, about 5.0 percent chromium, about 2.0 percent molybdenum, about 6.00 percent tungsten, about 3.0 percent rhenium, about 8.70 percent tantalum, about 5.60 percent aluminum, about 0.10 percent hafnium, balance nickel and incidental impurities; and MX-4, which has a nominal composition as set forth in U.S. Pat. No. 5,482,789, in weight percent, of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.05 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities. The use of the present invention is not limited to these preferred alloys, and has broader applicability.

The modified aluminum-containing protective layer 45 is deposited overlying and contacting the surface 42 of the substrate 44, numeral 62. The mode of deposition depends on the nature of the aluminum-containing protective layer 45, and the above descriptions are incorporated here. In the case of the simple diffusion aluminide and the diffusion aluminide modified by the addition of a noble metal, the heating may be continued to interdiffuse the layers to the extent desired, numeral 64.

The ceramic layer 50 is optionally deposited overlying and contacting the modified aluminum-containing protective layer 45, numeral 66. Prior to deposition of the ceramic layer 68, the surface of the deposited bond coat layer 64 is typically processed to remove any oxides present and to roughen the surface to better adhere with the ceramic. Conveniently, the surface may be processed by grit blasting. The ceramic layer 50 is preferably from about 0.003 to about 0.010 inch thick, most preferably about 0.005 inch thick. (FIG. 2 is not drawn to scale.) The ceramic layer 50 is preferably yttria-stabilized zirconia, which is zirconium oxide containing from about 2 to about 12 weight percent, preferably from about 4 to about 8 weight percent, of yttrium oxide. Other operable ceramic materials may be used as well. The ceramic layer 50 may be deposited by any operable technique, such as physical vapor deposition or plasma spray. The substrate and bond coat thereon are typically heated to a temperature of from about 750° C. to about 1050° C. during the deposition step 66.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A protected article, comprising:
   a substrate having a surface; and
   a protective coating overlying and contacting the surface of the substrate, the protective coating comprising
      a modified protective layer which is a diffusion aluminide, the modified protective layer having a composition comprising
      nickel,
      aluminum, and
      at least one modifying element selected from the group consisting of calcium, magnesium, and barium, and mixtures thereof, in a total amount of at least about 50 parts per million by weight.

2. The protected article of claim 1, wherein the modified aluminum-containing protective layer further comprises:
   elements interdiffused into the modified aluminum-containing protective layer from the substrate.

3. The protected article of claim 1, wherein the substrate is a nickel-base superalloy.

4. The protected article of claim 1, wherein the substrate has a composition selected from the group consisting of
   Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities;
   Rene' 142, which has a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.50 percent hafnium, about 0.12 percent carbon, about 15 parts per million boron, balance nickel and incidental impurities; and
   Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities.

5. The protected article of claim 1, wherein the at least one modifying element comprises calcium.

6. The protected article of claim 1, wherein the at least one modifying element is present in a total amount of from about 50 parts per million by weight to about 300 parts per million by weight.

7. The protected article of claim 1, wherein the modified aluminum-containing protective layer is a simple diffusion aluminide resulting from the diffusion of a layer containing only aluminum and the at least one modifying element into the surface of the substrate.

8. The protected article of claim 1, wherein the protective coating further comprises
   a ceramic layer overlying and contacting the modified aluminum-containing protective layer.

9. A method for preparing a protected article, comprising the steps of:
   furnishing a substrate having a surface; and
   depositing a protective coating onto the surface of the substrate, the step of depositing a protective coating including the steps of
      interdiffusing a simple diffusion aluminide onto the surface of the substrate, the simple diffusion aluminide protective layer having a composition comprising
      nickel,
      aluminum, and
      at least one modifying element selected from the group consisting of calcium, magnesium, barium, and mixtures thereof, in a total amount of at least about 50 parts per million by weight.

10. The method of claim 9, wherein the simple diffusion aluminide protective layer further contains a noble metal.

11. The method of claim 9, including an additional step, after the step of interdiffusing a simple diffusion aluminide protective layer, of
   depositing a ceramic layer overlying and contacting the simple diffusion aluminide protective layer.

12. A protected article, comprising:
   a substrate having a surface; and
   a protective coating overlying and contacting the surface of the substrate, the protective coating comprising
      a modified diffusion aluminide protective layer having a composition comprising
      nickel,
      aluminum,
      a noble metal, and
      at least one modifying element selected from the group consisting of calcium, magnesium, and barium, and mixtures thereof, in a total amount of at least about 50 parts per million by weight.

13. The protected article of claim 12, wherein the modified diffusion aluminide protective layer further comprises:
   elements interdiffused into the modified diffusion aluminide protective layer from the substrate.

14. The protected article of claim 12, wherein the substrate is a nickel-base superalloy.

15. The protected article of claim 12, wherein the at least one modifying element comprises calcium.

16. The protected article of claim 12, wherein the at least one modifying element is present in a total amount of from about 50 parts per million by weight to about 300 parts per million by weight.

17. The protected article of claim 12, wherein the protective coating further comprises
   a ceramic layer overlying and contacting the modified aluminum-containing protective layer.

* * * * *